Patented Jan. 9, 1923.

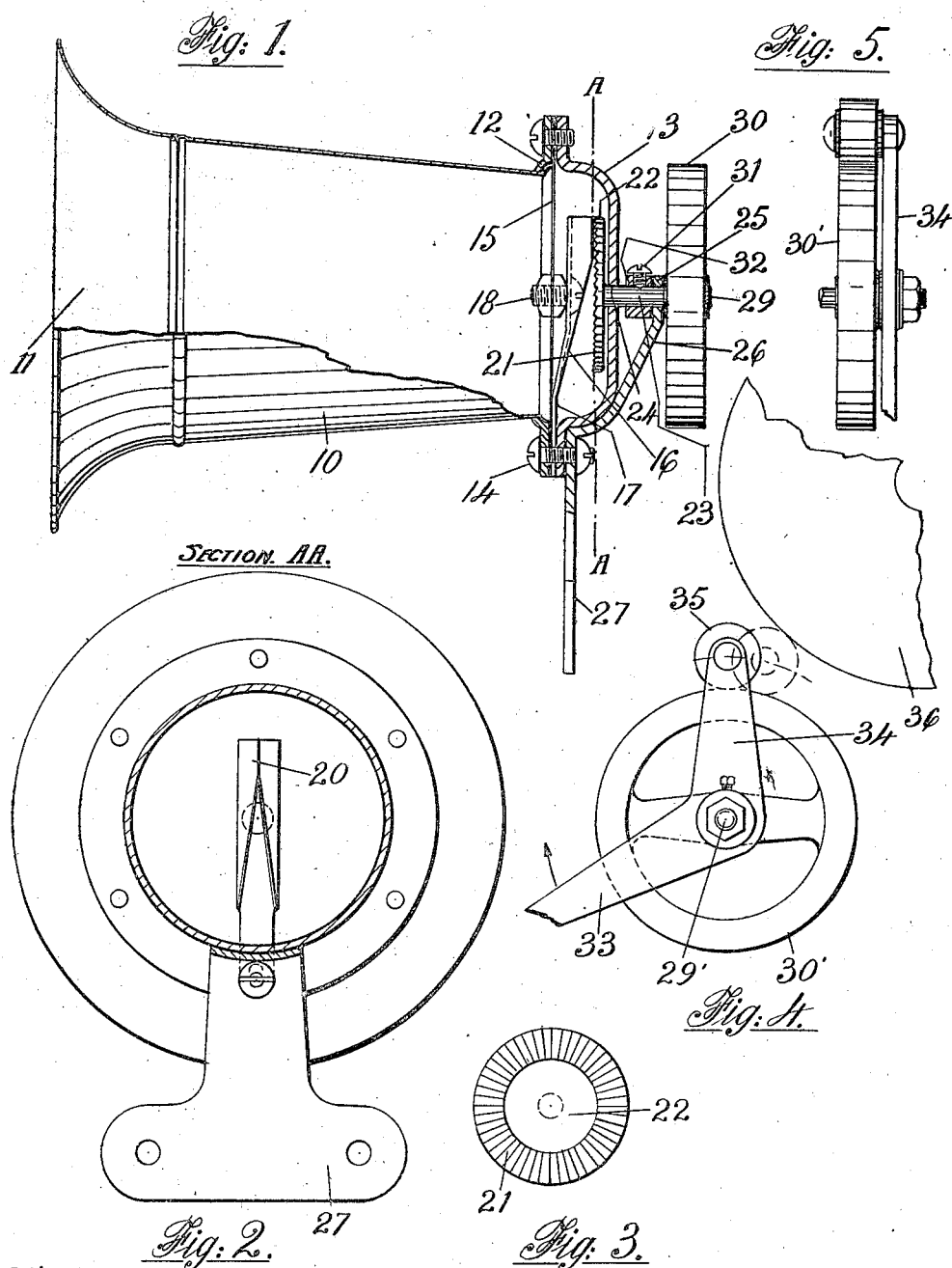

1,441,574

UNITED STATES PATENT OFFICE.

NICOLA GIUSTO, OF LONG ISLAND CITY, NEW YORK.

AUTOMOBILE HORN.

Application filed April 5, 1919. Serial No. 287,915.

*To all whom it may concern:*

Be it known that I, NICOLA GIUSTO, a subject of the King of Italy, residing at Long Island City, in the county of Queens and State of New York, have invented a new and useful Automobile Horn, of which the following is a specification.

This invention relates to automobile horns and its main object is to produce an automobile horn of a simple and inexpensive construction, composed of very few parts as compared with other devices of a similar character.

A further object is to provide an automobile horn of a novel and extremely simple construction, where all gears, springs, and other intermediate elements usually found in such devices between the plunger and the diaphragm are entirely done away with, so that no parts can get out of order.

With these and other objects in view, as will more fully appear as the description proceeds, this invention consists of certain novel constructions and arrangements of parts, as will be hereinafter described and claimed in the appended claims.

Referring to the drawings, Fig. 1 is a side view in elevation, partly sectional, of my improved horn;

Fig. 2 is a rear view in elevation, partly sectional, through line A—A of Fig. 1;

Fig. 3 is a detail front view of the vibrator; and

Figs. 4 and 5 are respectively a detail rear view, partly broken away, illustrating the manner of operating my improved horn by means of the motor fly wheel and a detail side view in elevation of the same.

Referring to Figs. 1 to 3, 10 designates the body of the horn, having a flaring mouth 11 of any suitable shape. The body 10 is interlocking or integral with flange 12, to which is attached a flanged cap 13 by means of bolts 14 or in any other suitable manner. Between the flange 12 and flanged cap 13, a vibrating diaphragm 15 is inserted and retained in position. The same is preferably made of sheet steel, but can also be made of mica or fibre or any other suitable material.

A vibrating lever 16, preferably made of sheet metal, is held at one end 17 between flange 12 and flanged cap 13 and is connected to the center of the diaphragm in any suitable manner, for instance, by means of a bolt 18. Its free end 19 is formed so as to provide an edge 20 abutting against a toothed portion 21 provided on the face of a vibrator 22.

Said vibrator 22 is fixed or welded on a shaft 23, rotatably mounted, as shown in Fig. 1, in bearing 24, provided in the rear of cap 13 and bearing 25 provided in bracket 26, which is attached to said flange cap. A projecting portion 27 of said bracket can be used for mounting the device in position as shown in Fig. 1. On the outer end 29 of shaft 23 is mounted a hand wheel 30 which is used to operate the device. Said hand wheel is made of a comparatively heavy construction so that it acts as a fly wheel in such a way that one impulse imparted to it with the hand will cause the same to make several revolutions in succession on account of its momentum. The position of shaft 23 can be adjusted at will and then rendered permanent by tightening screw 31 in set collar 32.

The operation of the device is very simple since all that is necessary to do is to give an impulse to hand wheel 30. The toothed portion 21 operated against edge 20 will cause lever 16 to vibrate and therefore to communicate its vibrations to diaphragm 15.

In other forms of horns, the vibrations of the diaphragm are usually produced by means of a pinion abutting against an axial pin attached to the center of the diaphragm; this pin is found to wear out very quickly and furthermore, there are a number of elements required in order to impart to said pinion the desired motion.

In my improved device, the edge of the vibrating lever is made sufficiently long so that it will not wear out very quickly; furthermore, the form of the lever itself and the way in which same is mounted is such the vibrations of the diaphragm are very easily obtained, the operation of said lever 16 being similar in a way to that of a vibrating lever in a phonograph sound box.

Vibrator 22 is preferably made of embossed sheet metal in order to reduce the cost of production of the device.

The embodiment of my invention as shown in the drawings, on the other hand, allows various parts to be made small while the hand wheel can be made of a comparatively large diameter, thus being easier to operate and having greater capacity for acquiring the desired momentum.

My improved horn can also be mounted on an automobile in such a way as to cause the same to be operated through the action of a fly wheel. Such an arrangement is illustrated in Figs. 4 and 5, where it is seen that a crank lever composed of an operating arm 33 and a roller bearing arm 34, which is mounted on shaft 29'. It is obvious that by pulling arm 33 in the direction of the arrow and causing therefore arm 34 to move toward the right, roller 35, which is in permanent contact with the surface of fly wheel 35, will also come into contact with fly wheel 36, which is constantly revolving. Therefore, the motion of fly wheel 36 will be transmitted to fly wheel 30' and the horn will thus be operated.

From the foregoing, it is seen that I provide a novel form of automobile horn, the construction of which is much simpler than that of other devices made for the same purpose, the same being easily assembled and being inexpensive to manufacture and extremely simple in its construction.

It is obvious that the various details of construction of my device may be changed to some extent without departing from the spirit of my invention; therefore, I reserve for myself the right to bring to same all those changes and modifications which may enter fairly into the scope of the appended claims.

I claim:

1. In a device of the class described and in combination with a body and a vibrating diaphragm, a vibrating lever arranged in a plane substantially parallel to said diaphragm, said lever being fixed at one end to said body and having its vibrating portion attached to the center of said diaphragm, the free end of said lever projecting beyond said center.

2. In a device of the class described, the combination of a body, a vibrating diaphragm, a vibrating lever attached to the center of said diaphragm and arranged in a plane substantially parallel to the same, said lever being fixed to said body at one of its ends and having its other end projecting beyond the center of said diaphragm and means controlling the operation of said vibrating lever.

3. In a device of the class described, the combination of a body, a vibrating diaphragm, a vibrating lever attached to the center of said diaphragm and arranged in a plane substantially parallel to the same, said lever being fixed to said body at one of its ends and having its other end projecting beyond the center of said diaphragm and means rotatable in a plane also substantially parallel to said diaphragm controlling the operation of said vibrating lever.

4. In a device of the class described, the combination of a body, a vibrating diaphragm, a vibrating lever attached to the center of said diaphragm and arranged in a plane substantially parallel to the same, said lever being fixed to said body at one of its ends and having its other end projecting beyond the center of said diaphragm, means rotatable in a plane also substantially parallel to said diaphragm controlling the operation of said vibrating lever and means for axial adjustment of said rotatable means.

NICOLA GIUSTO.

Witnesses:
K. FORD,
PASQUALE PASCALE.